3,766,090
PROCESS FOR REGENERATING ACTIVE CARBON LOADED WITH SULFURIC ACID
Harald Juntgen, Essen-Heisingen, and Karl Knoblauch, Essen, Germany, assignors to Bergwerksverband GmbH, Essen, Germany
No Drawing. Filed July 19, 1971, Ser. No. 162,970
Claims priority, application Germany, July 17, 1970, P 20 35 466.9
Int. Cl. B01j *11/02;* B01d *15/06*
U.S. Cl. 252—413                              5 Claims

ABSTRACT OF THE DISCLOSURE

Process for regenerating active carbon loaded with sulfuric acid following its use as an adsorbent for $SO_2$ from exhaust gases which comprises in a first step washing out the major amount of adsorbed sulfuric acid with dilute sulfuric acid and/or water and in a second step washing out the remaining sulfuric acid using water and gaseous ammonia or ammonia water as washing agent.

---

This invention relates to a process for regenerating active carbon loaded with sulfuric acid.

It is already known to adsorb $SO_2$ from exhaust gases containing small amounts of $SO_2$ by means of active carbon. The $SO_2$ is through the oxygen and water vapor also present in the exhaust gas oxidized to sulfuric acid. The sulfuric acid can then be easily washed out from the active carbon with water. The washed active carbon is thereafter used to adsorb further amounts of $SO_2$. In this process, the activity of the carbon becomes lower and lower so that it is no longer suitable for use as an adsorption agent.

The capacity of the active carbon can be increased by impregnating the same with catalytically active substances. However, most catalytic substances are soluble in sulfuric acid so that on washing of the active carbon they are scrubbed out into the sulfuric acid. The activity of the active carbon is thereby decreased and furthermore the recovered sulfuric acid must be purified for removal of the catalyst materials.

It is also known to carry out the $SO_2$ scrubbing in the presence of ammonia or to treat the sulfuric acid loaded carbon in the presence of gaseous ammonia or with ammonia water. This procedure produces only ammonium sulfate and no sulfuric acid. The desirable material is of course the sulfuric acid. An economical method for converting the recovered ammonium sulfate solution into sulfuric acid is not yet available.

It is an object of this invention to regenerate active carbon loaded with sulfuric acid in an economically feasible manner, which avoids the disadvantages of the prior art.

Another object of this invention is a continuous process for the regeneration of active carbon loaded with sulfuric acid.

Still another object of the invention is the regeneration of the active carbon loaded with sulfuric acid obtained in the process of removing $SO_2$ from exhaust gases.

These and other objects and advantages of the invention will become apparent from a consideration of the following disclosure.

In accordance with the invention there is now provided a process for regenerating active carbon loaded with sulfuric acid which comprises in a first step washing out the major amount of adsorbed sulfuric acid from the active carbon, i.e., about 60–90% with dilute sulfuric acid or water as scrubbing agent and in a second step washing out the remaining adsorbed sulfuric acid with water, water and gaseous ammonia or ammonia water as scrubbing agent. The solution taken off from the second step contains a small amount of ammonium sulfate while the solution taken off in the first step contains sulfuric acid in considerable amounts.

In practical operation, the active carbon following its use as an adsorbent for $SO_2$ and the oxidation thereof to sulfuric acid in connection with a process wherein the active carbon is used in a moving or stationary layer for treating exhaust gases, is contacted with sulfuric acid or water for washing out the major amount of adsorbed sulfuric acid. The sulfuric acid used as washing agent has a concentration of between 1 and 35 wt.-percent and preferably 5 and 25 wt.-percent. The greater part of the bound $H_2SO_4$ is easily washed out from the active carbon into the washing agent which is then treated to form concentrated sulfuric acid therefrom.

In a second step, the balance of the sulfuric acid is scrubbed out of the active carbon in the presence of $NH_3$ or ammonia water. The active carbon recovered from the second washing step can be used directly for adsorbing further $SO_2$. Drying is not necessary as this will automatically take place on further contact with exhaust gases.

The ammonium sulfate solution formed in the second step can be treated with alkali, for instance with caustic lime to form ammonia which can be recycled into the process.

Most surprisingly the activity of the active carbon treated in accordance with the invention does not decrease even after one hundred successive adsorption and desorption procedures.

In accordance with the process of the invention it has now been established that the residual content of sulfuric acid amounting to 30 to 80 g./kg. of active carbon can be recovered by means of the reciprocal action between ammonia and sulfuric acid and the adsorption capacity of the active carbon for further sulfuric acid restored. It is accordingly possible in accordance with the invention to first scrub out the main amount of sulfuric acid and namely about 150–250 g. $H_2SO_4$/kg. active carbon using water or dilute sulfuric acid and working up the scrubbing agent from this step for recovery of sulfuric acid therefrom, while the balance of the adsorbed sulfuric acid and namely 10–40 wt.-percent can be removed from the active carbon followiing the first step washing by treatment thereof with $NH_3$ and water.

The following examples are given in order to more fully illustrate the invention but are in no wise to be construed as limitative thereof.

EXAMPLE 1

A moist active carbon loose material was conducted downwardly and continuously through a container through which an exhaust gas was being passed upwardly, the exhaust gas was derived from a coal burning installation and had a temperature of 140° C. and an $SO_2$ content of 1220 p.p.m. The active carbon on reaching the bottom of the container contained 260 g. $H_2SO_4$/kg. active carbon; the gas discharged from the container had an $SO_2$ content of 30 p.p.m.

The active carbon was continuously removed from the container and passed horizontally through 5–10% $H_2SO_4$ and thereafter through a perpendicularly arranged tube and back into the container. In the perpendicularly arranged tube, the active carbon which still contained 50 g. $H_2SO_4$/kg. active carbon was washed with water while there was simultaneously passed through the tube in an upward direction gaseous ammonia.

The 5–10% $H_2SO_4$ was continuously replaced by water and worked up to form concentrated $H_2SO_4$. The liquid discharged from the tube was either through evaporation or by decomposition of the ammonium sulfate by means of alkali converted into gaseous $NH_3$.

EXAMPLE 2

An active carbon loose material A was treated with an exhaust gas heated to a temperature of 160° C. which had been derived from an oil burning installation.

After the adsorption of 240 g. $H_2SO_4$/kg. active carbon, an increase in the $SO_2$ content of the exhaust gas following passage through the loose material A was observed and accordingly the exhaust gas was conducted into contact with fresh active carbon loose material B.

The material A was washed with water until 190 g. $H_2SO_4$/kg. active carbon had been washed out. The flowing off sulfuric acid was worked up to form concentrated $H_2SO_4$.

After completion of the water washing, the active carbon A was washed with 5% ammonia water until substantially no sulfuric acid was detectable in the active carbon.

In the meantime, the loose material B had become saturated with sulfuric acid and was replaced with regenerated material A. The material A evidenced its original $H_2SO_4$ adsorption capacity.

EXAMPLE 3

An active carbon loaded with 240 g. $H_2SO_4$/kg. active carbon as described in Example 2 was washed with 10% sulfuric acid until 150 g. $H_2SO_4$/kg. active carbon had been washed out. Thereafter, an additional 30 g. sulfuric acid per kg. active carbon was washed out with water.

The water washing was continued with gaseous ammonia being passed from below upwardly through the active carbon until substantially no sulfuric acid or ammonium sulfate was detectable. The ammonium sulfate containing water which was conducted off, reacted with alkali and the freed ammonia used for further second stage washing.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be secured by Letters Patent is set forth in the appended claims.

We claim:

1. Process for regenerating active carbon loaded with sulfuric acid following the use of the active carbon for adsorbing $SO_2$ from exhaust gases which consists essentially of a first step of washing out between 60 to 90% of the adsorbed sulfuric acid from the active carbon by contacting the same with dilute sulfuric acid or water as washing agent and a second step of washing out the remaining adsorbed sulfuric acid by contacting the active carbon recovered from the first step with water and ammonia.

2. Process according to claim 1, wherein said washing agent used in said second step is ammonia water.

3. Process according to claim 1 wherein said washing agent used in said second step is water and gaseous ammonia.

4. Process according to claim 1, wherein said washing agent in said first step is 1–35 wt.-percent sulfuric acid.

5. Process according to claim 1, wherein said washing agent in said first step is 5–25 wt.-percent sulfuric acid.

References Cited

UNITED STATES PATENTS

| | | | |
|---|---|---|---|
| 3,486,852 | 12/1969 | Tamura et al. | 23—2 S |
| 3,473,297 | 10/1969 | Tamura et al. | 55—73 |
| 3,475,133 | 10/1969 | Müller-Wartenburg | 23—168 |
| 3,440,007 | 4/1969 | Takeuchi | 252—412 |

FOREIGN PATENTS

| | | | |
|---|---|---|---|
| 1,546,961 | 11/1968 | France | 252—420 |

DANIEL E. WYMAN, Primary Examiner

P. E. KONOPKA, Assistant Examiner

U.S. Cl. X.R.

55—73; 252—412, 420; 423—244